2 Sheets—Sheet 1

N. SWICKARD.

WAGON OR CAR UNLOADING APPARATUS.

No. 4,212. Reissued Dec. 20, 1870.

Witnesses
Thomas Taylor
S. Hannay

Noah Swickard
(by) A. McCallum
Atty

2 Sheets—Sheet 2.

N. SWICKARD.

WAGON OR CAR UNLOADING APPARATUS.

No. 4,212. Reissued Dec. 20, 1870.

Witnesses
Thomas Taylor
P. Hannay

Noah Swickard
by A. McCallum
Atty

United States Patent Office.

NOAH SWICKARD, OF GALVA, ASSIGNOR, BY MESNE ASSIGNMENTS, TO NICHOLAS E. PHILLIPS AND JOHN W. CLINE, OF KNOX COUNTY, ILLINOIS.

Letters Patent No. 83,005; dated October 13, 1868; reissue No. 4,212, dated December 20, 1870.

IMPROVEMENT IN WAGON AND CAR-UNLOADING APPARATUS.

The Schedule referred to in these Letters Patent and making part of the same.

*To all whom it may concern:*

Be it known that I, NOAH SWICKARD, of Galva, in the county of Henry and State of Illinois, have invented certain Improvements in Apparatus for Unloading or Dumping Wagons and Cars, of which the following is a specification.

The object of my invention is to provide a simple and effective means for dumping or unloading wagons or cars; and The invention consists in combining with a stationary platform or floor a tilting-platform, through the operation of which the wagon or car is discharged of its contents.

The invention further consists in combining and arranging with these platfor as suitable mechanism for operating the same, so that the tilting-platform shall be retained perfectly steadfast while the wagon or car is being moved or driven upon it for the purpose of unloading, and then, when ready, permit of its being tilted so as to depress one end and raise the other, and thereby dump or discharge the load; and in connection therewith, a device to prevent the platform from tilting further than is necessary to unload the wagon.

And further, the invention consists in combining with these stationary and tilting platforms a suitable receptacle for the reception of the load when discharged from the car or wagon, and in so arranging its lid or cover as that it may act as a guide for the loaded wagon or car into the required position on the tilting-platform without obstructing its passage.

In the accompanying drawing—

A represents the fixed or stationary platform or floor, to the joists or beams of which is pivoted a tilting-platform, B, so constructed as that its forward end shall rest upon the stationary platform, while its rear end, consisting of beams or bars B', shall play within openings or slots formed in the floor for their reception, so that when required the rear end of the platform may descend below the line of the floor.

This peculiar construction of the platform B obviates the necessity of cutting a hole in the floor so large as would otherwise be necessary, and relieves its supports from the weight of the team in passing over it.

At the rear ends of platform B, and for their support, are arranged self-adjusting standards, E; they are operated by a lever, F, secured to a shaft, *f*, which latter is provided with projections or cams, *f'*, so that the movement of the lever will cause the cams to force the standards E from under the rear ends of platform B and allow it to descend. When the pressure on the lever is removed and the platform brought up again flush with the floor the standards E will resume their former position, and again support the tilting platform.

Figure 1:
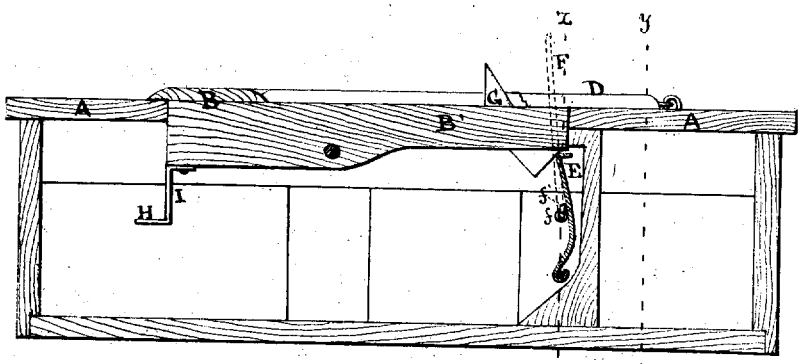
Figure 1 is a longitudinal section taken through the line *x x*, fig. 2.
Figure 2:
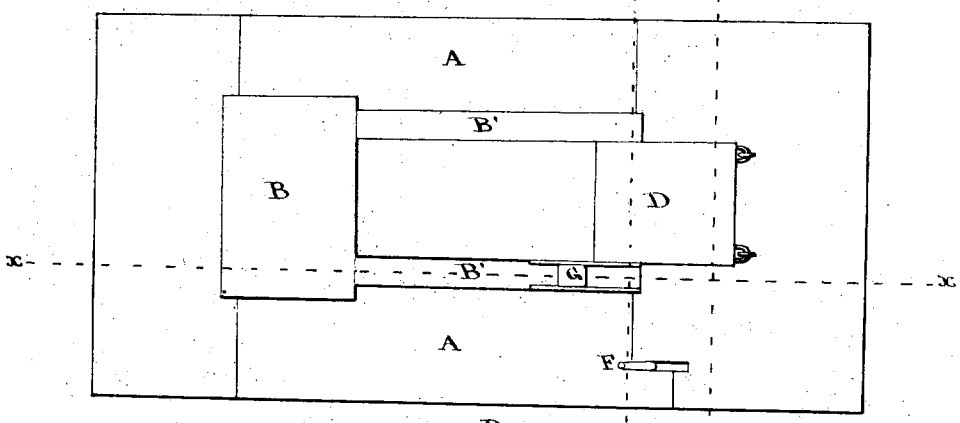
Figure 2 is a plan view.
Figure 3:
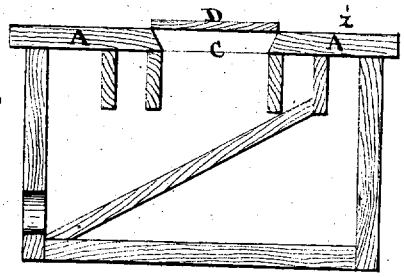
Figure 3 is a transverse section taken through the line *y y*, figs. 1 and 2.
Figure 4:
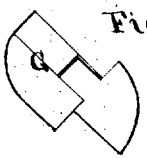
Figure 4 is a perspective view of a self-acting dog.
Figure 5:
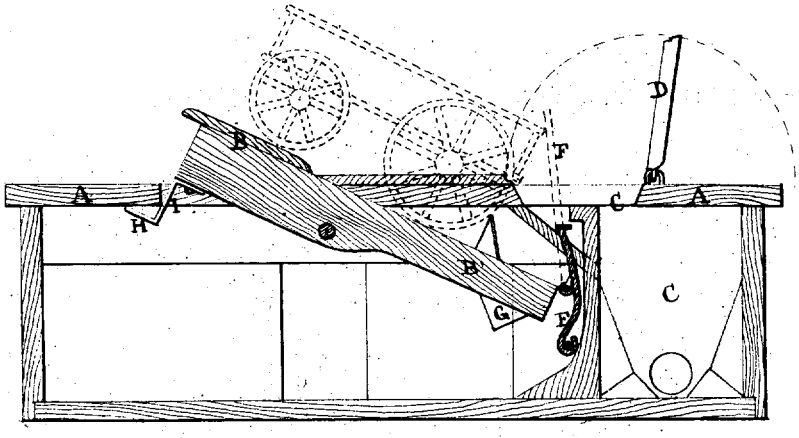
Figure 5 is a longitudinal section showing the operation of the tilting-platform.
Figure 6:
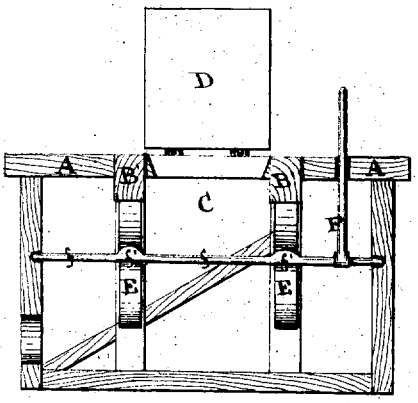
Figure 6 is a transverse section taken through the lines *z z*, figs. 1 and 2.

The forward end of platform B is provided with a suitable device for arresting its ascent so as to prevent its tilting further than necessary to unload the wagon. The device, as shown in fig. 1, consists of bars I, of wood or metal, secured one on each side of this end of the platform B, and extending downward. They are provided with cross-bars or stops, H, and operate to prevent the platform rising higher than is required, while at the same time they close that end of the slots in the floor A exposed by the tilting of platform B, and prevent the possibility of accidents to the team, which might occur if these openings were not so closed.

Near the rear ends of platform B self-acting dogs G are pivoted. These dogs are so constructed and arranged as to permit the car or wagon to pass over them when driven onto the platform from the rear; but as soon as the wheels have passed into the required position on the platform they rise up and prevent the backward movement of the wagon, and thus hold it securely while being dumped.

C is a receiving-chute or bin, arranged in rear of platform B. It is provided with a lid, D, hinged to the floor A. When closed, this lid acts as a guide for bringing the wheels of the wagon into the required position on platform B; and when raised, it opens the mouth of chute C for the reception of the load as discharged or dumped from the wagon.

The operation of the dumping apparatus is as follows:

The loaded wagon is driven onto the platform B from its rear end until the rear wheels pass over the dogs G, which then rise to prevent any backward movement. In this position the wagon is ready to be unloaded, previous to which, however, the lid D is raised to allow the load to pass into the chute or hopper C. Then, by moving the lever F, the standards E are withdrawn from under the rear ends of the platform, B', and by a slight pressure on the rear of the wagon the platform B tilts, and in this way dumps the load into the chute or hopper C. As soon as unloaded the team is started, when by its forward passage the weight of the wagon will raise the platform B flush with the floor A, and the standards or supports E, relieved from the action of lever F, will move into proper position to support the platform, ready to receive the next loaded wagon.

By laying rails, in proper position, along platform B, cars may be unloaded in the same way.

What I claim as my invention is—

1. The tilting platform B, in combination with platform or floor A, as and for the purpose set forth.

2. Spring supports E, arranged and operating in connection with platforms A and B, for the purpose set forth.

3. The combination of spring supports E, lever F, and cam-shaft *f*, for the purpose set forth.

4. The combination of platform B with self-acting dogs G, for the purpose set forth.

5. The combination of platforms A and B with a stop device, I, for the purpose set forth.

6. The combination of platforms A and B with receiving-bin or chute C, operated substantially as described, for the purpose set forth.

7. The combination of platforms A and B with lid D, for the purposes set forth.

NOAH SWICKARD.

Witnesses:
FORREST F. COOKE,
D. H. CLARKE.